United States Patent [19]

Mae et al.

[11] Patent Number: 4,996,119
[45] Date of Patent: Feb. 26, 1991

[54] SPEAKER CONE PLATE AND METHOD OF FORMING

[75] Inventors: Yutaka Mae; Yoichi Yaguchi, both of Tokyo; Masakatsu Sakamoto, Hachiohji, all of Japan

[73] Assignee: Kabushiki Kaisha Kenwood, Tokyo, Japan

[21] Appl. No.: 325,040

[22] Filed: Mar. 17, 1989

Related U.S. Application Data

[63] Continuation-in-part of Ser. No. 129,910, Dec. 7, 1987, abandoned, which is a continuation of Ser. No. 768,342, Aug. 22, 1985, abandoned.

[30] Foreign Application Priority Data

Aug. 27, 1984 [JP] Japan ................... 59-176599
Aug. 27, 1984 [JP] Japan ................... 59-176600

[51] Int. Cl.⁵ .............. B32B 15/04; G10K 13/00; B29C 43/10; B05D 3/02
[52] U.S. Cl. .................... 428/469; 428/368; 428/698; 428/472; 428/689; 428/902; 427/34; 427/376.3; 427/376.4; 264/DIG. 50; 264/DIG. 57; 264/570; 264/60; 181/167; 181/170; 181/173
[58] Field of Search ........... 428/367, 368, 469, 472, 428/689, 698, 902; 427/34, 376.3, 376.4; 264/60, 570, DIG. 50, DIG. 57; 181/167, 168, 169, 170, 173

[56] References Cited

U.S. PATENT DOCUMENTS

| | | | |
|---|---|---|---|
| 4,315,858 | 9/1982 | Hunold et al. | 427/193 |
| 4,317,850 | 3/1982 | Verburgh et al. | 427/370 |
| 4,652,413 | 3/1987 | Tiegs | 264/570 X |

FOREIGN PATENT DOCUMENTS

| | | | |
|---|---|---|---|
| 161318 | 12/1979 | Japan | 181/169 |
| 11598 | 1/1982 | Japan | 181/167 |
| 30495 | 2/1982 | Japan | 181/167 |
| 17795 | 1/1984 | Japan | 181/167 |
| 135000 | 8/1984 | Japan | 181/170 |
| 197 | 1/1985 | Japan | 427/34 |
| 59-897 | 4/1985 | Japan | 181/168 |
| 159566 | 7/1986 | Japan | 427/34 |
| 7804454 | 10/1979 | Netherlands | 427/376.3 |
| 954285 | 4/1964 | United Kingdom | 264/60 |

OTHER PUBLICATIONS

Metals Handbook vol. 7 Jun. 1984 "Hot Isostatic Pressing of Metal Powders" pp. 419-443, note pp. 424 & 436.

*Primary Examiner*—Merrell C. Cashion, Jr.
*Assistant Examiner*—Susan S. Rucker
*Attorney, Agent, or Firm*—Sixbey, Friedman, Leedom & Ferguson, Jr.

[57] ABSTRACT

A speaker cone plate is provided with an inorganic surfacial hard layer formed at least on a face of a metal substrate and is subjected to a reinforcing treatment by hot isostatic pressing, wherein the surfacial hard layer may be composed of a carbide, an oxide, a borie or a phosphide or may be formed by plasma thermal spraying of an inorganic substance containing silicon nitride whiskers or silicon carbide whiskers.

8 Claims, 3 Drawing Sheets

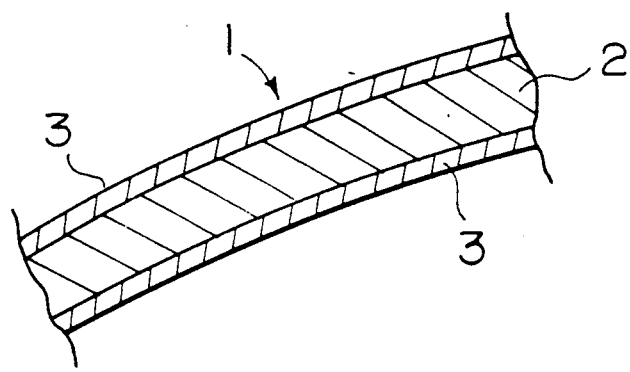
F I G. 1
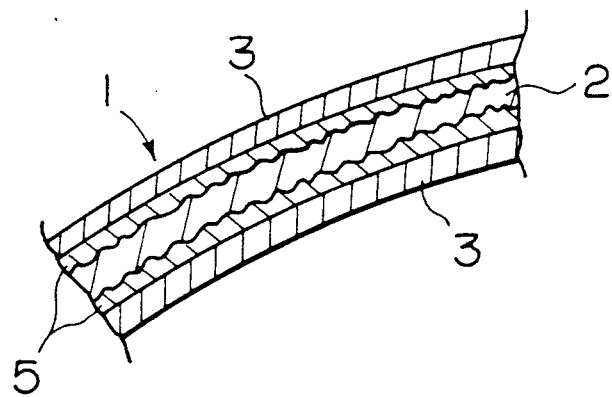
F I G. 2
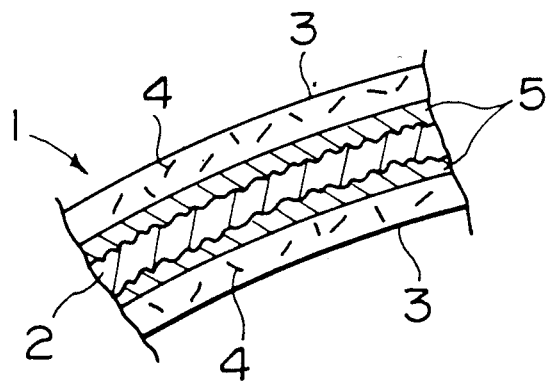
F I G. 3

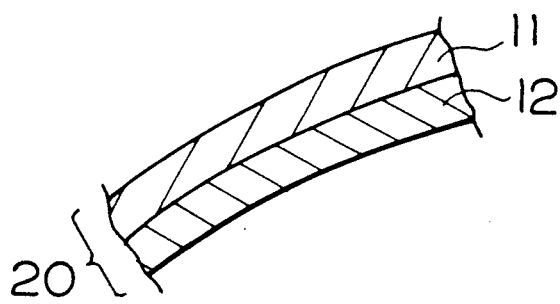
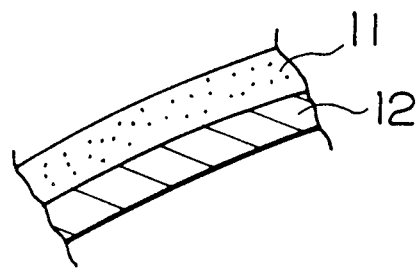
F I G. 4  F I G. 5
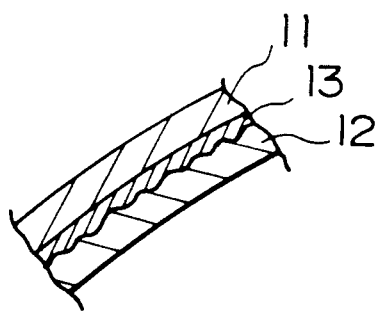
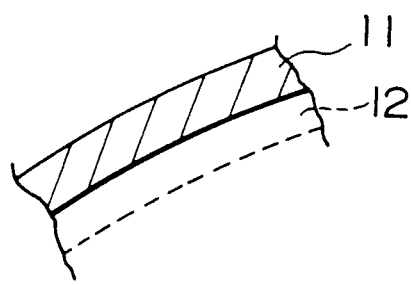
F I G. 6  F I G. 7
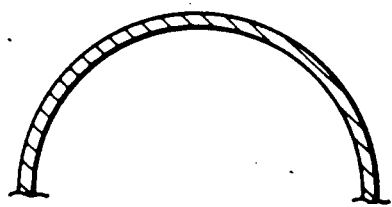
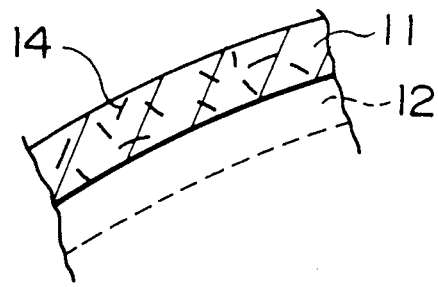
F I G. 8  F I G. 9

SPEAKER CONE PLATE AND METHOD OF FORMING

This application is a continuation-in-part of Ser. No. 07/129,910, filed Dec. 7, 1987, now abandoned, which itself was a Continuation of application Ser. No. 06/768,342, filed Aug. 22, 1985, now abandoned.

BACKGROUND OF THE INVENTION

1. Field of the Invention

The present invention relates to a method for forming a speaker cone plate, more particularly a high frequency speaker cone plate.

2. Description of the Prior Art

Speaker cone plate generally requires a high Young's modulus and a large propagation speed, but particularly in a high frequency speaker cone plate, rigidity and surface hardness are important factors for improving the high frequency characteristics.

Conventionally, the rigidity of the speaker cone plate has been improved by forming a hard layer for example, of an aluminum oxide, silicon carbide, silicon oxide or boron carbide on the surface of speaker cone plate.

However, in such conventional methods in which the hard layer is simply formed by vacuum evaporation, ion plating, thermal spraying or electroplating on the surface of the speaker cone plate, the hard layer may show satisfactory performance for example, strength-to-weight ratio, but the substrate of the speaker cone plate is unable to show enough strength per weight, so that a satisfactory strength cannot be achieved over the entire speaker cone plate.

Also a metal substrate with a hard layer formed thereon by ion plating is associated with a drawback of pores remaining on the surface and in the interior of the speaker cone plate. Besides, in this method, the evaporation of hard layer onto the substrate stimulates anisotropic vertical crystal growth of the evaporated material, which tends to give rise to deterioration of bending, torsion and shear strengths, eventually leading to cracking and tipping of the speaker cone plate.

SUMMARY OF INVENTION

In consideration of the foregoing, the object of the present invention is to provide a speaker cone plate of lighter weight and higher strength.

The speaker cone plate of the present invention is featured by being provided with an inorganic surfacial hard layer formed at least on a face of a metal substrate and being subjected to a reinforcing treatment by hot isostatic pressing, wherein said surfacial hard layer may be composed of a carbide, an oxide, a boride or a phosphide or may be formed by plasma thermal spraying of an inorganic substance containing silicon nitride whiskers or silicon carbide whiskers.

According to another aspect of the present invention, there is provided a method comprising the steps of forming an inorganic hard layer on a face of a metal substrate having the shape of speaker cone plate, then reinforcing said hard layer by hot isostatic pressing to obtain a reinforced inorganic hard layer, and removing said metal substrate to obtain a speaker cone plate consisting of said reinforced inorganic hard layer, and the speaker cone plate of the present invention is obtained by the above-described method.

In said speaker cone plate, the hard layer may be composed of a carbide, an oxide, a boride or a phosphide, or may be formed by plasma thermal spraying of an inorganic substance containing silicon nitride whiskers or silicon carbide whiskers.

BRIEF DESCRIPTION OF THE DRAWINGS

FIGS. 1 to 3 are schematic views showing the steps of forming speaker cone plate according to a first embodiment of the present invention; and FIGS. 4 to 9 are schematic views showing the steps of forming speaker cone plate according to a second embodiment of the present invention.

DETAILED DESCRIPTION OF THE PREFERRED EMBODIMENTS

First Embodiment

Figure 11:
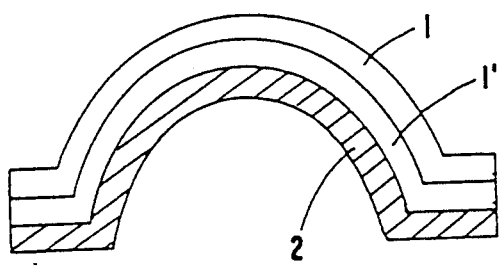
FIG. 11 is a schematic view showing the steps of forming a speaker cone plate according to a third embodiment of the present invention.

In the following, the present invention will be clarified by a first embodiment shown in FIGS. 1 to 3.

In the drawings there are shown an entire speaker cone plate 1; a metal substrate 2 of said speaker cone plate composed of a metal of high rigidity such as titanium; and a surfacial hard layer 3 formed on one face or both faces of said metal cone plate and composed of a carbide, an oxide, a boride or a phosphide, preferably titanium carbide or aluminum oxide, or a mixture thereof. Said surfacial hard layer 3 may also be formed by plasma thermal spraying of an inorganic substance containing, as shown in FIG. 3, silicon nitride whiskers or silicon carbide whiskers 4.

The speaker cone plate 1 of the above-described structure is reinforced by hot isostatic pressing (HIP method).

As already known, said pressing method has various advantages, particularly (1) applicability even to a material not accepting plastic working, (2) possibility of incorporating a large amount of reinforcing alloy elements, and (3) possibility of obtaining an extremely homogeneous structure, without segregation as in case of casting. These advantages are suitable for reinforcing a speaker cone plate and are therefore adopted in the present invention.

The actual process is conducted for example in the following manner. The speaker cone plate 1 constructed as explained above is placed in vacuum of $10^{-4}$ Torr, and is then pressed at 570 kg/cm² by introducing highly pure argon gas. Subsequently temperature is raised to 1,100° C. with second pressurizing to 2,000 kg/cm² and this state is maintained for 2 hours, and the process is terminated by cooling. The preferred range of heating temperature is from 800° to 1,300° C., since the speaker cone plate does not become dense enough at a temperature lower than 800° C., and it may be become fragile at a temperature higher than 1,300° C. On the other hand, the second pressing is preferably conducted in a range from 1,000 to 2,000 kg/cm², since the speaker cone plate 1 does not become dense enough at a pressure lower than 1,000 kg/cm² while the service life of the pressurizing apparatus will be shortened at a pressure higher than 2,000 kg/cm².

The speaker cone plate 1 formed as explained above shows significant improvement in elasticity and rigidity, by the formation of diffusion layers 5 as shown in FIGS. 2 and 3 and the compactization of the surfacial hard layer 3. More specifically it is rendered possible to improve the effective value of E/ρ (Young's modulus to density-ratio) and to prevent cracking or tipping of the cone plate through a higher rigidity attained by the elimination of pores remaining on the surface and in the interior of the evaporated layer, a stronger bonding between the titanium substrate and the surficial hard evaporated layer of titanium nitride or titanium carbide achieved by the diffusion of different phases present at the boundary of crystals, and homogenization of anisotropic crystal layer.

In the structure shown in FIG. 3, whiskers are dispersed in the surficial hard layer 3. Preferred examples of the whisker-containing inorganic material for thermal spraying are a mixture of alumina and silicon nitride whiskers, manufactured by Showa Denko Co., Ltd. under a trade name of Shocote KWN-16, and a mixture of zirconia and silicon nitride whiskers, manufactured by Showa Denko Co., Ltd. under a trade name of Shocote KWN-90.

Second Embodiment

In the following, there will be explained a second embodiment of the present invention with reference to FIGS. 4 to 9.

At first, as shown in FIG. 4, an inorganic hard layer 11 is formed by ionic or chemical process such as evaporation, ion plating, sputtering, thermal spraying, electroplating or electroless plating on a face of a metal substrate 12 having the shape of a speaker cone plate to obtain a laminated member 20.

Examples of said inorganic material are carbides, oxides, borides, phosphides etc.

The above-mentioned laminated member 20 is reinforced by a hot isostatic pressing to obtain a reinforced inorganic layer from said inorganic hard layer 11, and said metal substrate 12 is subsequently removed.

The above-described forming process will be more specifically explained in the following in relation to FIGS. 5 to 7.

At first, in a step shown in FIG. 5, the inorganic hard layer 11 is formed on a face of the metal substrate 12 through one of the above-mentioned methods, is then placed in vacuum of $10^{-4}$ Torr, and is pressurized to 570 kg/cm² by introducing highly pure argon gas. Subsequently the temperature is raised to 1,100° C. with second pressurizing at 2,000 kg/cm² and this state is maintained for 2 hours, and the process is terminated by cooling. The preferred range of the heating temperature is from 800° to 1,300° C., since the inorganic hard layer 11 does not become dense enough at a temperature lower than 800° C. and it may become fragile at a temperature higher than 1,300° C. On the other hand the second pressurization is preferably conducted in a range from 1,000 to 2,000 kg/cm², since the inorganic hard layer 11 does not become dense enough at a pressure lower than 1,000 kg/cm² while the service life of the pressurizing apparatus may be shortened at a pressure higher than 2,000 kg/cm². In this manner not only the inorganic hard layer 11 but also the metal substrate 12 are rendered denser, and a highly rigid diffusion layer 13 is formed, as shown in FIG. 6, between the two. In a final step shown in FIG. 7, the metal substrate 12 showing relatively small improvement in the rigidity and the diffusion layer 13 are removed through a chemical or physical method, thereby providing a dome-shaped speaker cone plate composed of the reinforced inorganic hard layer as shown in FIG. 8. The diffusion layer 13 may not be removed by the selection of the materials and method, but the essential importance lies in the removal of the metal substrate 12.

The formation of the hard layer 11 on a face of the metal substrate 12 may also be achieved by plasma thermal spraying of an inorganic substance containing inorganic whiskers 14 such as of silicon nitride or silicon carbide as shown in FIG. 9, and, in such case, further reinforcement can be achieved by a plurality of above-mentioned whiskers dispersed in the hard layer 11.

The speaker cone plate formed in the above-described manner allows to improve the effective value of E/ρ (Young's modulus to density-ratio) and to prevent cracking or tipping, through a higher rigidity attained by elimination of pores remaining in the interior, homogenization of isotropic crystal layer etc.

Third Embodiment

Figure 10:
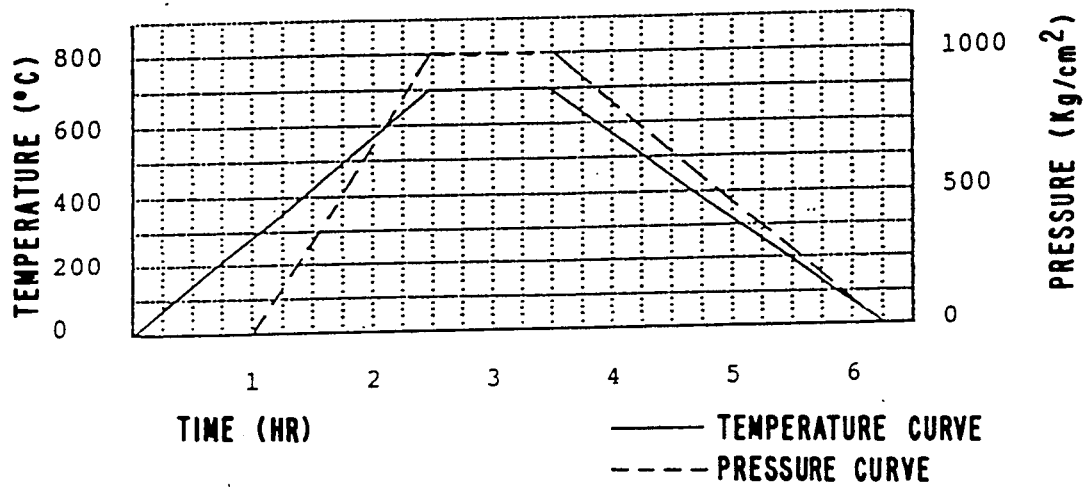
FIG. 10 is a graph of temperature and pressure curves versus time for HIP processing.

In a third embodiment, illustrated in FIGS. 10 and 11, a hard layer coated diaphragm is made from a dome type of titanium diaphragm substrate with a diameter of 1 inch and a thickness of 25 micrometers. The substrate is coated with a carbon layer having a thickness of 0.2 micrometers by depositing evaporated graphite on the substrate in an ion plating process. Thereafter, the samples are subjected to the HIP processing.

The HIP processing is conducted in an inert gas atmosphere of Argon within a chamber under the following conditions.

| Temperature | 700° C. |
|---|---|
| Pressure | 1000 Kg/cm |
| Processing Time | 1 Hour |
| Temperature Raising Rate | 5° C./min |
| Temperature Decaying Rate | −3° C./min |

The temperature and pressure curves vs. time in the experiments of HIP processing are as shown in FIG. 10.

The HIP processed carbon hard layer deposited on the titanium substrate is melted by a mixed solution of hydrogen fluoride and fuming nitric acid. The film of the melted material is observed using an electron microscope and a transmission type electron microscope to obtain the images of transmission of diffraction. The physical properties of HIP processed carbon hard layer coated titanium diaphragm and unprocessed carbon hard layer coated titanium diaphragm were measured for ten samples of each class and the results are shown in table 1.

TABLE 1

|  | Density (ρ) × 10³ Kg/m | Young's Modulus × 10¹⁰ N/m² | Accoustic Propagation Speed m/s | Rigidity × 10⁻⁶ N/m² | Internal Loss (TD) | TD. E/ρ |
|---|---|---|---|---|---|---|
| HIP processed sample | 4.321 | 26.82 | 7878 | 1.252 | 0.0149 | 9.248 × 10⁵ |
| Unprocessed | 4.395 | 15.73 | 5983 | 0.733 | 0.0151 | 5.404 × 10⁵ |

TABLE 1-continued

| | Density (ρ) × $10^3$ Kg/m | Young's Modulus × $10^{10}$ N/m² | Accoustic Propagation Speed m/s | Rigidity × $10^{-6}$ N/m² | Internal Loss (TD) | TD. E/ρ |
|---|---|---|---|---|---|---|
| sample | | | | | | |

The physical properties of the diaphragm samples were measured by constructing a tweeter unit using the samples. The constructed tweeters are mounted to a spherical baffle and a microphone is placed one meter from the tweeters while an input power of one watt is applied to the tweeters. From the measured frequency characteristics curves, it is observed that the HIP processing on the tweeters raised the high region resonant frequency from 22 KHz to 25-30 KHz.

From the face spacing data of the HIP processed carbon hard layer formed on the basis of the electron beam diffraction image, carbon and carbide titanium are shown to exist. The structure of the HIP processed diaphragm can be approximated as shown in FIG. 11. The third layer 1' of carbide titanium is created between the titanium substrate 2 and the carbon layer 1 through the HIP processing.

According to table 1, the physical characteristics of the diaphragm indicate that although the Young's modulus of the HIP processed carbon hard layer coated diaphragm significantly rises as compared with the unprocessed diaphragm (about 1.7 times), the internal loss is substantially unchanged. Since the HIP processing makes the carbon hard layer denser, it is anticipated that over time the Young's modulus will increase and the internal loss of the diaphragm will decrease. Generally speaking, the Young's modulus and the internal loss are related so that when one is large the other is small. Since a high Young's modulus and a large internal loss of the material for the speaker diaphragm are preferable, the quantity TD. E/ρ in table 1 is a criterion for the quality of the speaker diaphragm material. In the HIP processed carbon hard layer coated diaphragm according to the present invention, it was unanticipated that while Young's modulus increases, the internal loss is substantially unchanged. The reason the large internal loss remains as it was through the HIP processing is understood to be due to the creation of the third layer of carbide titanium between the titanium substrate and the carbon layer, that is, the creation of a composite structure diaphragm.

From the measured frequency characteristics curves, it was recognized that the high frequency region resonant frequency was raised from 22 KHz to 25-30 KHz by the HIP processing. This is due to the increase of Young's modulus, while sharp response peaks which possibly appear due to the high Young's modulus were not found in the frequency characteristics curves in the HIP processed carbon hard layer coated diaphragm. This is because the large internal loss remains even after the HIP processing.

Increasing the density of the carbon hard layer deposited on the titanium diaphragm substrate through the HIP processing is not necessarily good for speaker diaphragms because of the possible decrease of internal loss. In this sense, it was not expected that the HIP processing always brings better physical characteristics for hard layer coated speaker diaphragms. Contrary to expectations, however, with the appropriate HIP processing, the internal loss does not decrease due to the creation of the third carbide titanium layer. Accordingly, conventional HIP processing, examples do not suggest the significant technical advantage of the HIP processing onto the hard layer coated speaker diaphragm. They do not suggest the creation of the third layer in addition to the high density of the hard layer and prevention of peeling-off of the hard layer.

As compared with the first and second embodiments where carbides, oxides, borides, phosphides, and etc., are used as the coating layer, when graphite is used as the coating layer relatively low processing temperatures, as low as 500° C. are available because a high quality crystalline structure of the deposit can be obtained even at relatively low temperatures using graphite.

In the same manner as those of the first and second embodiments, whiskers of a mixture of a lamina and silicon nitride or zirconia and silicon nitride are dispersed into the carbon layer 1 as shown in FIG. 11 for further reinforcement.

In contrast to the conventional speaker cone plate obtained by merely forming a hardening layer on a metal substrate, the speaker cone plate of the present invention allows drastic improvement in the specific rigidity, thus enabling secure prevention of parasite or divided vibrations particularly when applied to high- or medium-frequency speakers and chambers. Also a significantly improved frequency response allows faithful reproduction of pulse-like waves.

Also, the speaker cone plate forming method according to the present invention is capable of easily producing the speaker cone plate with the above-explained advantageous characteristics, without any particular increase in cost.

We claim:

1. A speaker diaphragm comprising a laminate treated by a hot isostatic press, including an inorganic surfacial hard layer on at least one face of a metal diaphragm substrate which has a higher density and a higher resultant effective ratio of E/ρ than would an unpressurized and unheated laminate composition, wherein said inorganic surfacial hard layer is selected from the group consisting of carbides, borides, or phosphides and is reinforced together with said metal diaphragm substrate by hot isostatic pressing; said surfacial hard layer being formed on said metal diaphragm substrate by plasma thermal spraying of an inorganic material, said inorganic material containing whiskers of silicon nitride or silicon carbide.

2. A method of fabricating a speaker diaphragm comprising the steps of:
   providing a metal diaphragm substrate;
   forming a layer of inorganic material on at least one side surface of said metal diaphragm substrate, said inorganic material being selected from the group consisting of carbides, oxides, borides, or phosphides with the diaphragm substrate metal;
   subjecting a laminate of said metal diaphragm substrate and inorganic material layer to a hot isostatic pressing;
   wherein said hot isostatic pressing is effected by subjecting said laminate to a temperature in a range from 800° C. to 1,300° C. and a pressure greater than at least 1,000 Kg/cm².

3. A method according to claim 2 further comprising the step of:
preprocessing said laminate at a pressure of about 570 Kg/cm² in an inert gas atmosphere prior to said hot isostatic pressing step.

4. A method according to claim 2 further comprising the step of:
removing said substrate from the laminate subjected to the hot isostatic pressing.

5. A method according to claim 2, wherein said inorganic material to be formed as a layer on at least one side surface of said metal diaphragm contains inorganic whiskers and is deposited onto at least one side surface of said metal diaphragm by a plasma thermal spraying.

6. A speaker diaphragm comprising:
a metal diaphragm substrate formed of titanium;
an inorganic hard layer formed of carbon on at least one side surface of said metal diaphragm substrate; and
a compound layer formed of carbide titanium between said metal diaphragm substrate and said inorganic hard layer, wherein
said compound layer is formed by subjecting a laminate of said metal diaphragm substrate and said inorganic hard layer to a hot isostatic processing.

7. A method of fabricating a speaker diaphragm comprising the steps of:
providing a titanium diaphragm substrate;
depositing evaporated graphite on said titanium diaphragm substrate to form a carbon layer on said titanium diaphragm substrate; and
subjecting a laminate of said titanium diaphragm substrate and carbon layer to hot isostatic pressing to form a carbide titanium layer at the interface of said titanium diaphragm substrate and the deposited carbon layer.

8. A method according to claim 7, wherein said hot isostatic pressing is conducted in an inert gas atmosphere within a chamber under temperature of 700° C. and pressure of 1,000 Kg/cm.

* * * * *